Nov. 16, 1937.   J. A. FINDORA   2,099,200
SPRING CUSHION
Filed July 14, 1936   2 Sheets—Sheet 1

INVENTOR.
John A. Findora
BY Barnes, Kisselle, Laughlin & Raisch
ATTORNEYS.

Nov. 16, 1937.    J. A. FINDORA    2,099,200
SPRING CUSHION
Filed July 14, 1936    2 Sheets-Sheet 2

INVENTOR.
John A. Findora
BY
Barnes, Kisselle, Laughlin & Raisch
ATTORNEYS.

Patented Nov. 16, 1937

2,099,200

UNITED STATES PATENT OFFICE 2,099,200

SPRING CUSHION

John A. Findora, Adrian, Mich., assignor to Stubnitz-Greene Spring Corporation, Adrian, Mich., a corporation of Michigan Application July 14, 1936, Serial No. 90,544

5 Claims. (Cl. 155—180)

This invention relates to a spring cushion and more particularly to a spring cushion for an automotive vehicle.

It is the object of this invention to produce a spring cushion which is simple in structure, cheaper to manufacture than spring cushions presently being used in the automotive industry, which is easier to trim and also lends itself to a neater and better trim job than heretofore obtained, which has concealed fasteners for securing the trim to the cushion frame and which has a frame very easily formed to fit the uneven contour of the present day vehicle body floor.

Figure 1:
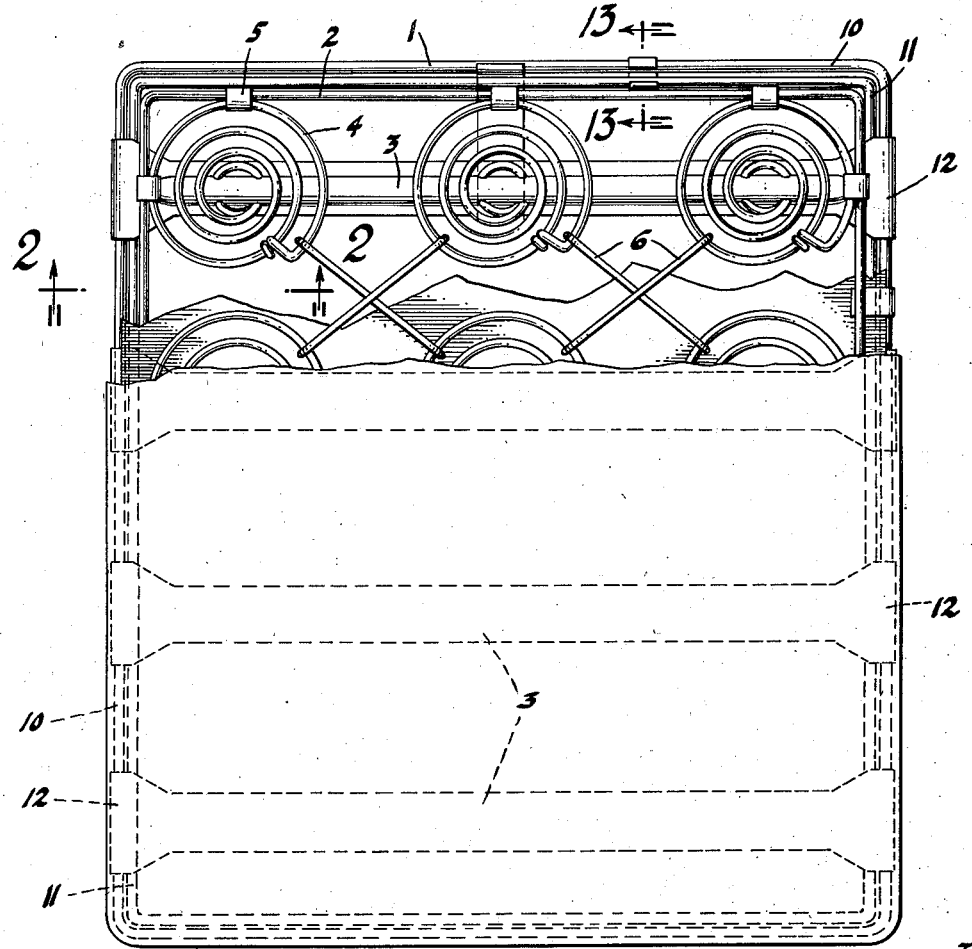
Fig. 1 is a top plan view of a spring cushion with the trim partly broken away.
Figure 2:
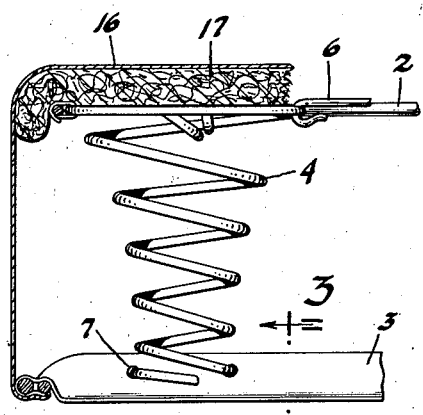
Fig. 2 is a section along the line 2—2 of Fig. 1.
Figure 3:
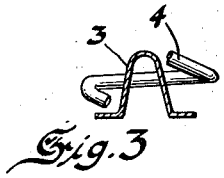
Fig. 3 is a section along the line 3—3 of Fig. 2.

Referring more particularly to the drawings there is shown a spring cushion having a bottom frame generally designated 1, a top frame 2, cross slats 3 and coil springs 4. The top frame 2 is a continuous wire frame and the outside coil springs are secured thereto by the clamps 5. The coil springs are secured to each other by the cross wires 6 in the usual manner. The bottom ends of the coil springs 4 are threaded into openings 7 in the slats 3 which support the springs.

Figure 11:
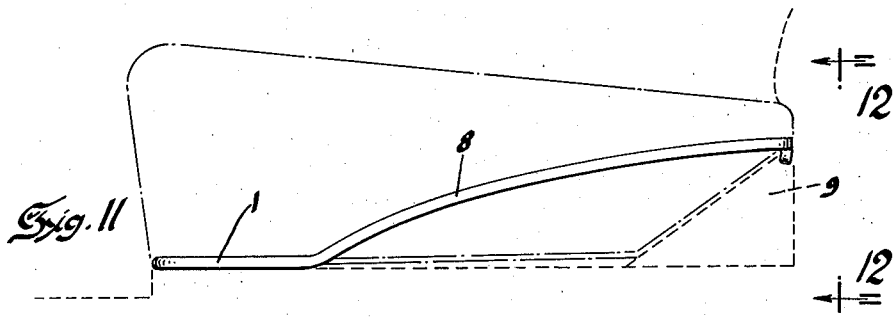
Fig. 11 is a side view.
Figure 12:
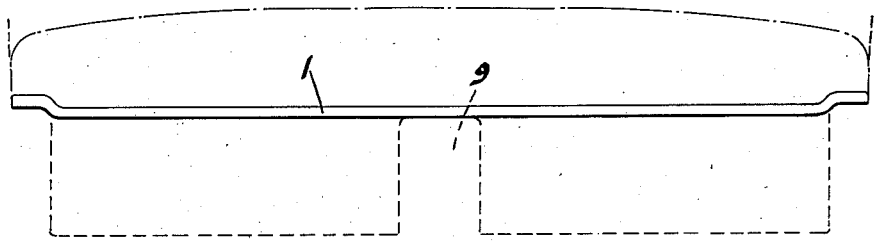
Fig. 12 is a rear end view along the line 12—12 of Fig. 11 showing in the full lines the uneven contour of the bottom frame of the spring cushion necessary to adapt the rear seat in a standard make of automobile to the vehicle body floor to accommodate the differential housing and also the rear wheel housings.

In the manufacture of automobiles the trend is to get the center of gravity of the vehicle as near to the ground as possible. In carrying out this trend the vehicle body floor has been lowered and necessarily the floor is formed to accommodate the differential housing, the propeller shaft and the rear wheel housings. This uneven contour of the floor has necessitated the fabricating of the spring cushion bottom frame with a corresponding contour. In Figs. 11 and 12 there is shown a rear seat spring cushion for a well-known make of automobile, the bottom frame 1 of which is shown in the full lines. As viewed in Fig. 11 it will be noted how the ends of the frame have been curved upwardly and rearwardly as at 8 to accommodate the rear wheel housings, and in Fig. 12 it will be noted how the front side of the bottom frame and the springs have been arranged as at 9 to accommodate the tunnel in the floor for the propeller shaft and the differential housing. These various uneven shapes into which the bottom frame must be formed make it highly desirable, from the standpoint of economy and manufacture, that the bottom seat frame should be such that it can be readily shaped to any form desired. To achieve this end it is proposed to make the bottom seat frame 1 in the form of two separate continuous wire frames 10 and 11, frame 11 being positioned within the outer frame 10. The wire from which the frames 10 and 11 is made preferably is circular in cross section but other sectional shapes of wire can be used such, for example, as a rectangular section. Frames 10 and 11 have corresponding shapes and frame 11 has a smaller periphery and fits within, and in spaced relation with, the outer frame 10.

Figure 4:
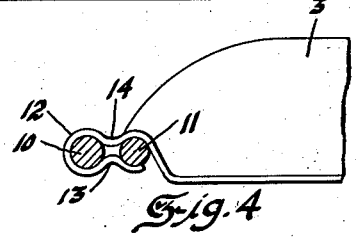
Figs. 4 and 5 are detail views showing the manner of attachment of the slats to the bottom frame.
Figure 5:
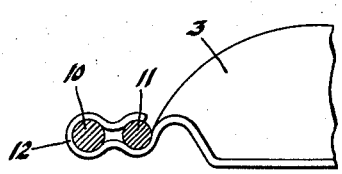

The frames 10 and 11 are secured together by the slats 3, as shown in Figs. 4 and 5. In Fig. 4 the flared end 12 of the slat 3 is positioned on top of the frames, then bent downwardly and inwardly to fix the frames together whereas in Fig. 5 the ends 12 of the slats are positioned under the frames 10 and 11, then bent upwardly and inwardly to secure the frames together. In each case it will be noted that the ends 12 of the slats 3 are indented as at 13 and 14 so that the frames 10 and 11 are fixed together in spaced relation.

Figure 13:
Fig. 13 is a section along the line 13—13 of Fig. 1 showing the clamp for securing the members of the bottom frame together.

As shown in Fig. 13, the sides of the frames 10 and 11 which extend parallel to the cross slats 3 are held together by the flat steel strip clamps 15. This plural wire type of bottom frame 1 is very easily and economically shaped to any form required to accommodate the uneven contour of the body floor.

Another object of this invention is to produce a spring cushion which can be easily and neatly trimmed. To this end the trimming 16 is placed upon the padding 17 positioned on top of the coil springs 4. The trimming 16 is then drawn downwardly and inwardly, as at 18, about the outer frame 10 and then wrapped about the inner frame 11. The trimming 16 is then secured to the inner frame 11 by the spring clips 19 of the type shown and described in copending application of Daniel A. Greene, Serial No. 25,771, filed June 10, 1935. The spring clip fastener 19 is thus completely concealed and yet is very readily accessible in case one desires to remove it. The spring clips 19, of course, will be mounted on the inner frame 11 between the slats 3, which portion of the inner frame is readily accessible to the workman. The fact that the trimming 16 is drawn around the outer frame 10 as at 18 and then the end drawn inwardly and about the inner frame 11 is very important because the outer frame serves to snub the trimming 16 whenever the load is removed from the spring cushion and the trimming 16 is stretched and drawn taut by the coil springs 4. This snubbing action on the trimming 16, achieved by drawing the trimming 16 about the outside frame 10, materially relieves the load which would otherwise be placed upon the spring clip fasteners 19 and thus practically prevents any wear of the trimming where it is secured to the frame 11.

Figure 8:
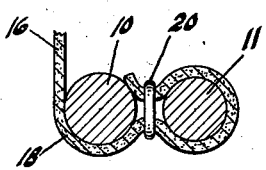
Figure 9:
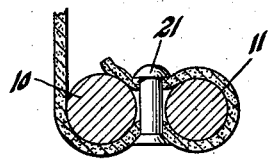
Figure 10:
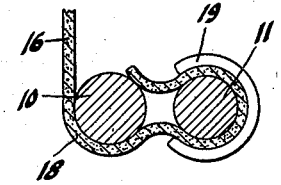

In Figs. 8 and 9 there are shown optional forms of fasteners for securing the trimming to the bottom frame 1. In Fig. 8 the trimming is secured to the frames 10 and 11 by a plurality of wire staples 20 and in Fig. 9 by a plurality of split rivets 21. Both the staples 20 and the rivets 21 pass between the outside frame 10 and inside frame 11.

Figures 6, 7:
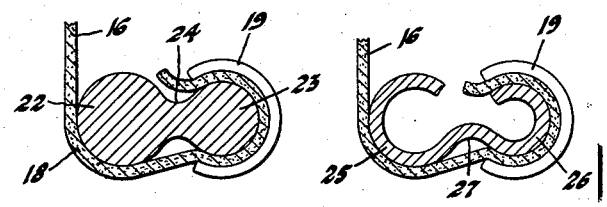
Figs. 6 through 10 are detailed enlarged sections similar to Fig. 2 showing different forms of the bottom frame and different fasteners for securing the trim material to the bottom frame.

A modified form of a bottom frame 1 is shown in Fig. 6. In this modified form the bottom frame comprises an outer frame portion 22 and an inner frame portion 23 which are connected by the web portion 24. This type of frame can be made by passing a large wire through a suitable die which forms it into the outer and inner frame portions 22 and 23 with the interconnecting web 24.

In the modified form shown in Fig. 7, the bottom frame comprises a steel strip, the outer edge portion of which is rounded and turned inwardly towards the center line of the strip to form the outer bead portion 25 and the inner end portion of which is rounded and turned inwardly towards the longitudinal center line of the strip to form the inner bead portion 26. The portions 25 and 26 form outer and inner frame members connected by the web 27.

In both of the forms shown in Figs. 6 and 7 the trimming 16 is secured to the frame by the clips 19. After the wire has been formed to the cross section shown in Fig. 6, it is formed into a rectangular frame of the contour desired and the abutting ends welded or otherwise secured together. Likewise, after the sheet steel strip has been formed into the section shown in Fig. 7, it also is shaped into a rectangular frame or frame of any contour desired and the abutting ends welded or otherwise secured together.

I claim:

1. A spring cushion comprising a bottom marginal frame of inner and outer members, means securing the inner frame member to the outer frame member, a plurality of slats bridging the opening defined by the frame and secured at opposite ends to the opposite sides of the frame to rigidify the same, a plurality of springs supported by the said slats, a covering for the springs passing downwardly about the outer frame member to compress the springs and then inwardly about the inner frame member, and means securing the covering to the inner frame member whereby the outer frame member acts as a snubber to relieve the fastening means from a substantial portion of the pressure applied to the covering by the said springs.

2. A spring cushion comprising a bottom marginal frame of inner and outer members, means securing the inner frame member to the outer frame member, a plurality of slats bridging the opening defined by the frame and secured at opposite ends to the opposite sides of the bottom frame to rigidify the same, a plurality of springs supported by the said slats, a covering for the said springs, the said covering passing downwardly along the side of the outer frame member and then inwardly about the inner frame member whereby the springs are compressed, and means securing the covering to the inner frame member whereby the outer frame member cooperates with the covering to snub the pressure which the springs apply to the covering and thereby relieve the fastening means from a substantial portion of the said spring pressure.

3. A spring cushion comprising inner and outer wire bottom marginal frame members, means securing the inner wire frame to the outer wire frame, a plurality of slats bridging the opening defined by the wire frame members and secured at opposite ends to the opposite sides of the inner and outer wire frame members to rigidify the same, a plurality of springs supported by the said slats, a covering for the springs passing downwardly about the outer wire frame member to compress the springs and then inwardly about the inner wire frame member, and means securing the covering to the inner wire frame member whereby the outer wire frame member acts as a snubber to relieve the fastening means from a substantial portion of the pressure applied to the covering by the said springs.

4. A spring cushion comprising inner and outer wire bottom marginal frame members having a circular cross section, means securing the inner wire frame to the outer wire frame, a plurality of slats bridging the opening defined by the wire frame members and secured at opposite ends to the opposite sides of the inner and outer wire frame members to rigidify the same, a plurality of springs supported by the said slats, a covering for the springs passing downwardly about the outer wire frame member to compress the springs and then inwardly about the inner wire frame member, and means securing the covering to the inner wire frame member whereby the outer wire frame member acts as a snubber to relieve the fastening means from a substantial portion of the pressure applied to the covering by the said springs.

5. A spring cushion comprising inner and outer wire bottom marginal frame members having corresponding shapes and positioned in substantially the same plane, a plurality of slats bridging the opening defined by the wire frame members and secured at opposite ends to the opposite sides of the inner and outer wire frame members to rigidify the same, a plurality of springs supported by the said slats, a covering for the springs passing downwardly about the outer wire frame member to compress the springs and then inwardly at substantially a right angle and then about the inner wire frame member, and means securing the covering to the inner wire frame member whereby the outer wire frame member acts as a snubber to relieve the fastening means from a substantial portion of the pressure applied to the covering by the said springs.

JOHN A. FINDORA.